United States Patent
Takkar et al.

(10) Patent No.: US 12,373,061 B1
(45) Date of Patent: Jul. 29, 2025

(54) CAPACITIVE SENSOR-BASED SYSTEM FOR SENSING SQUEEZE AND ENABLING EDGE INTERACTIONS

(71) Applicant: HUAWEI TECHNOLOGIES CO., LTD., Guangdong (CN)

(72) Inventors: Manpreet Singh Takkar, Brampton (CA); Wei Zhou, Richmond Hill (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/768,180

(22) Filed: Jul. 10, 2024

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01)

(58) Field of Classification Search
None
See application file for complete search history.

(56) References Cited

U.S. PATENT DOCUMENTS 11,036,327 B2 * 6/2021 Zhao .................. G06F 3/041

OTHER PUBLICATIONS

The Verge, "The Google Pixel's squeeze for assistant was a button without a button", Jul. 30, 2022, retrieved from : https://www.theverge.com/2022/7/30/23278192/google-pixel-2-active-edge-squeeze-sides-button-control on Apr. 23, 2024.
Yi et al., "Squeez'In: Private Authentication on Smartphones based on Squeezing Gestures", In proceedings of the 2023 CHI Conference on Human Factors in Computing Systems 2023, Apr. 23-28, 2023, Hamburg, Germany.

* cited by examiner

*Primary Examiner* — Stephen T. Reed
(74) *Attorney, Agent, or Firm* — BCF LLP

(57) ABSTRACT

Methods and devices for detecting a user interaction with an at least one edge of the device are disclosed. The device has a touchscreen with a capacitive sensor and a processor. The method includes acquiring a sequence of input frames from the capacitive sensor, a given input frame comprising information about capacitive readings of the capacitive sensor along an at least one edge of the touchscreen, and continuously detecting the user interaction with the at least one edge of the electronic device using the sequence of input frames.

20 Claims, 9 Drawing Sheets

700     700'     700"     700'"     700""

CAPACITIVE SENSOR-BASED SYSTEM FOR SENSING SQUEEZE AND ENABLING EDGE INTERACTIONS

FIELD

The present technology relates generally to user interfaces for electronic devices, and more particularly to capacitive sensor-based systems for sensing squeeze and enabling edge interactions.

BACKGROUND

Touchscreen devices are typically equipped with a capacitive sensor under the display. When a finger comes close or in contact with the screen and the capacitive sensor under it, multiple cells in this grid are activated. The readings from this capacitive sensor grid can be read as a 2D array or frame of data. Each element in this 2D array corresponds to the capacitive value of a cell in the sensor. The capacitive value can be read as a raw value which is then processed to get a differential image. This differential image is computed by processing (e.g., subtraction of) the raw array at a given instance and a base array. The information about the finger's interaction with the screen is captured by this sequence of raw frames and differential frames.

Most of the interactions with a touchscreen device correspond to interactions with the main screen and are done using either the index finger or thumb. Multiple pixels in capacitive data light up during touch with varying intensity depending on skin of finger is deformed at the touch.

However, additional capabilities for interacting with touchscreen devices are desired.

SUMMARY

Developers have devised methods and processors for overcoming at least some drawbacks present in prior art solutions.

Developers of the present technology have realized that detecting user interaction with edges of a device is desired. Some electronic devices may include strain gauges, for example, as additional sensors to detect when the edges of an electronic device are being "squeezed". Varying levels of force along the edges is measured using these strain gauges and the gesture can be mapped to launch the virtual assistant on device, for example. Furthermore, other touchscreen devices such as smartwatches, for example, provide additional buttons along edges for triggering additional functionalities. These buttons can be mapped to predefined functions or can be configured for user preference.

In at least some embodiments of the present technology, there is devised methods and electronic devices for detecting device-edge interactions using capacitive data of the touchscreen. The capacitive data at the edge of a touchscreen may include information indicative of whether a hand and/or part thereof is touching one or more edges (e.g., left and right) of the electronic device itself, when a user is holding the electronic device. The capacitive data of a capacitive sensor of a touchscreen may be processed in a variety of ways to detect one or more user interactions with the edge(s) of an electronic device, such as a "squeezing" performed on the edges of the electronic device, for example.

In the context of the present technology, a "squeeze" state refers to a user interaction with an edge of the electronic device where the user applies force on at least one edge of the electronic device. In some cases, the squeeze state may be achieved by simultaneously applying force on two opposite edges of the electronic device.

In the context of the present technology, an "un-squeeze" state refers to a user interaction with an edge of the electronic device where the user reduces force applied to at least one edge of the electronic device. In some cases, the un-squeezed state may be achieved by simultaneously reducing force applied on two opposite edges of the electronic device.

In the context of the present technology, a "normal holding" state refers to a user normally holding the electronic device without applying significant force on one or more edges of the electronic device, although some amount of force may be applied to actually hold the electronic device by the hand.

It should be noted that detecting some user interactions, such as a squeeze state, for example, does not necessarily require involvement of an entire hand with an edge of the electronic device. For example, in case of a smartwatch, the edges can be squeezed just using an index finger and/or thumb.

In some embodiments, there is provided methods and electronic devices for predicting an intended "gesture" of the user using a temporal sequence of states determined for a temporal sequence of frames from a capacitive sensor. For example, the electronic device may determine based on a sequence of frames whether the user is holding the device in a normal state, and/or if the user is squeezing the device, and/or if the user is un-squeezing the device, and/or if the user is performing one or more edge gestures.

In at least some embodiments, there is provided methods and electronic devices employing Machine Learning Algorithms (MLAs) such as Convolutional Neural Networks (CNNs) and Recurrent Neural Networks (RNNs) to process capacitive sensor data (a single frame, and/or a sequence of frames) and predict an intended user interaction along edge(s) of the electronic device.

Additionally, or alternatively, methods and electronic devices may employ one or more mechanisms for calibrating/updating decision-making boundaries based on touch samples collected explicitly from one or more users when hand holding a given electronic device. Calibration using explicitly collected samples may allow adaptation to user preferences and user specific features like shape and size of their finger, palm and their general interaction behavior. Additionally, or alternatively, methods and electronic devices may employ one or more mechanisms for calibrating/updating decision-making boundaries based on touch samples collected implicitly from one or more users when hand holding a given electronic device. Calibration using implicitly collected samples may allow adaptation to user preferences and user specific features like shape and size of their finger, palm and their general interaction behavior.

In some embodiments, there are provided methods and electronic devices for continuously monitoring for one or more user interactions with edges of the electronic device.

In some embodiments, there are provided methods and systems for detecting gestures associated with one or more edge(s) of the electronic device. It is contemplated that information regarding whether the user is squeezing or un-squeezing the one or more edges may be used in combination with additional information from the capacitive data and which is indicative of one or more specific locations of a squeeze or un-squeeze along the one or more edges. For example, the additional information from the capacitive data may allow to discriminate between a "squeeze near one end of an edge" and a "squeeze near the other end of the edge".

In this example, the electronic device may trigger different actions depending on which end of the edge is being squeezed. In an other example, this may allow to detect a "squeeze and slide" gesture along an edge of the electronic device. In this other example, the electronic device may trigger different actions depending on whether the user is just squeezing the edge, or whether the user is squeezing and sliding along the edge.

It is contemplated that information regarding whether the user is squeezing or un-squeezing the one or more edges may be used in combination with additional information from other modalities (e.g., IMU) than the capacitive sensor. For example, using accelerometer data may be further used to potentially reduce action mis-triggers and/or allowing triggering corresponding actions when the phone is in a certain orientation in addition to detecting a squeeze or un-squeeze interaction.

It should be understood that additional gestures to those described above may be detected based on at least a sequence of states determined for a sequence of frames from the capacitive sensor, without departing from the scope of the present technology.

In a first broad aspect of the present technology, there is provided a method of detecting a user interaction with at least one edge of an electronic device, the electronic device comprising a touchscreen with a capacitive sensor and a processor, the method executable by the processor. The method comprises acquiring a sequence of input frames from the capacitive sensor, the input frame comprising information about capacitive readings of the capacitive sensor along the at least one edge of the touchscreen; continuously detecting the user interaction with the at least one edge of the electronic device using the sequence of input frames.

In some embodiments of the method, the method further comprises identifying a Region Of Interest (ROI) of the input frame, the ROI including n columns of capacitive readings adjacent to the at least one edge of the touchscreen, n being an integer, and wherein the detecting comprises detecting the user interaction using only the ROI of the input frame.

In some embodiments of the method, the continuously detecting comprises: determining a sum of capacitive readings in the input frame; and in response to the sum of capacitive readings being above a pre-determined threshold, detecting the user interaction with the at least one edge of the electronic device.

In some embodiments of the method, the continuously detecting comprises: determining a first sum of capacitive readings for a first input frame from the sequence; determining a second sum of capacitive readings for a second input frame from the sequence, the second input frame being sequential to the first input frame; and in response to a difference between the first sum and the second sum being above a pre-determined threshold, detecting the user interaction with the at least one edge of the electronic device.

In some embodiments of the method, the method further comprises: acquiring explicit calibration data from the electronic device about a user of the electronic device; and adjusting the pre-determined threshold based on the explicit calibration data.

In some embodiments of the method, the method further comprises: acquiring implicit calibration data from the electronic device about a user of the electronic device; and adjusting the pre-determined threshold based on the implicit calibration data.

In some embodiments of the method, the method further comprises pre-processing the input frame by performing at least one of a filtering operation and a normalization operation, thereby generating a pre-processed input frame, and wherein the detecting comprises detecting the user interaction using the pre-processed input frame.

In some embodiments of the method, the continuously detecting comprises: generating a predicted class for the input frame using a classification model, the predicted class being indicative of the user interaction.

In some embodiments of the method, the classification model is at least one of a Convolutional Neural Network (CNN) and a Recurrent Neural Network (RNN).

In some embodiments of the method, the classification model is a binary classification model configured to classify the input frame as indicative of the user interaction, or otherwise not indicative of the user interaction.

In some embodiments of the method, the classification model is a multi-class classification model configured to classify the input frame as indicative of a first type of user interaction, a second type of user interaction, a third type of user interaction.

In some embodiments of the method, the predicted class is at least one of a squeezing state of touch, an un-squeezing state of touch, and a normal state of touch.

In some embodiments of the method, the method comprises generating a hand model based on the capacitive readings, and wherein the continuously detecting comprises using the hand model to determine a hand pose, the hand pose being indicative of at least one of a location, size, and shape of the user interaction along the at least one edge of the device using the input frame.

In some embodiments of the method, the method further comprises: generating a sequence of predicted classes for a sequence of input frames using a classification model; and determining a predicted gesture using the sequence of predicted classes.

In some embodiments of the method, the predicted gesture is a sliding touch gesture.

In some embodiments of the method, the determining the predicted gesture further comprises using an extracted feature from the input frame, the extracted feature being indicative of a location of the user interaction along the at least one edge of the device.

In some embodiments of the method, the determining the predicted gesture further comprises using other sensor data from a non-capacitive sensor.

In some embodiments of the method, the non-capacitive sensor is at least one of an Inertial Measurement Unit (IMU) sensor of the device and a barometer of the device.

In some embodiments of the method, the method further comprises: in response to the continuously detecting, triggering one or more actions associated with the user interaction.

In some embodiments of the method, the electronic device is a smartphone.

In some embodiments of the method, the electronic device is a smartwatch.

In a second broad aspect of the present technology, there is provided an electronic device for detecting a user interaction with at least one edge of the electronic device, the electronic device comprising a touchscreen with a capacitive sensor and a processor, The processor being configured to: acquire a sequence of input frames from the capacitive sensor, a given input frame comprising information about capacitive readings of the capacitive sensor along the at least one edge of the touchscreen; continuously detect the user interaction with the at least one edge of the electronic device using the sequence of input frames.

In some embodiments of the electronic device, to acquire comprises the processor configured to acquire a sequence of input frames including the input frame, and the processor being further configured to continuously monitor for the user interaction using the sequence of input frames.

In some embodiments of the electronic device, the processor is further configured to identify a Region Of Interest (ROI) of the input frame, the ROI including n columns of capacitive readings adjacent to the at least one edge of the touchscreen, n being an integer, and wherein the continuously detecting comprises detecting the user interaction using only the ROI of the input frame.

In some embodiments of the electronic device, to continuously detect comprises the processor configured to: determine a sum of capacitive readings in the input frame; and in response to the sum of capacitive readings being above a pre-determined threshold, continuously detect the user interaction with the at least one edge of the electronic device.

In some embodiments of the electronic device, to continuously detect comprises the processor configured to: determine a first sum of capacitive readings for a first input frame from the sequence; determine a second sum of capacitive readings for a second input frame from the sequence, the second input frame being sequential to the first input frame; and in response to a difference between the first sum and the second sum being above a pre-determined threshold, detect the user interaction with the at least one edge of the electronic device.

In some embodiments of the electronic device, the processor is further configured to: acquire explicit calibration data from the electronic device about a user of the electronic device; and adjust the pre-determined threshold based on the explicit calibration data.

In some embodiments of the electronic device, the processor is further configured to: acquire implicit calibration data from the electronic device about a user of the electronic device; and adjust the pre-determined threshold based on the implicit calibration data.

In some embodiments of the electronic device, the processor is further configured to pre-process the input frame by performing at least one of a filtering operation and a normalization operation, thereby generating a pre-processed input frame, and wherein to continuously detecting comprises the processor configured to detect the user interaction using the pre-processed input frame.

In some embodiments of the electronic device, to continuously detect comprises the processor configured to: generate a predicted class for the input frame using a classification model, the predicted class being indicative of the user interaction.

In some embodiments of the electronic device, the classification model is at least one of a Convolutional Neural Network (CNN) and a Recurrent Neural Network (RNN).

In some embodiments of the electronic device, the classification model is a binary classification model configured to classify the input frame as indicative of the user interaction, or otherwise not indicative of the user interaction.

In some embodiments of the electronic device, the classification model is a multi-class classification model configured to classify the input frame as indicative of a first type of user interaction, a second type of user interaction, a third type of user interaction.

In some embodiments of the electronic device, the predicted class is at least one of a squeezing state of touch, an un-squeezing state of touch, and a normal state of touch.

In some embodiments of the electronic device, the processor is configured to generate a hand model based on the capacitive readings, and wherein to continuously detect comprises the processor configured to use the hand model to determine a hand pose, the hand pose being indicative of at least one of a location, size, and shape of the user interaction along the at least one edge of the device using the input frame.

In some embodiments of the electronic device, the processor is further configured to: generate a sequence of predicted classes for a sequence of input frames using a classification model; and determine a predicted gesture using the sequence of predicted classes.

In some embodiments of the electronic device, the predicted gesture is a sliding touch gesture.

In some embodiments of the electronic device, to determine the predicted gesture further comprises the processor configured to use an extracted feature from the input frame, the extracted feature being indicative of a location of the user interaction along the at least one edge of the device.

In some embodiments of the electronic device, to determine the predicted gesture further comprises the processor configured to use other sensor data from a non-capacitive sensor.

In some embodiments of the electronic device, the non-capacitive sensor is at least one of an Inertial Measurement Unit (IMU) sensor of the device and a barometer of the device.

In some embodiments of the electronic device, the processor is further configured to: in response to continuously detecting, trigger one or more actions associated with the user interaction.

In some embodiments of the electronic device, the electronic device is a smartphone.

In some embodiments of the electronic device, the electronic device is a smartwatch.

In a third broad aspect of the present technology, there is provided a non-transient computer readable medium containing program instructions for causing an electronic device to perform a method of: acquiring sequence of input frames from the capacitive sensor, a given input frame comprising information about capacitive readings of the capacitive sensor along at least one edge of the touchscreen; continuously detecting the user interaction with the at least one edge of the electronic device using the sequence of input frames.

In some embodiments of the non-transient computer readable medium, the acquiring comprises acquiring a sequence of input frames including the input frame, and the method further comprises continuously monitoring for the user interaction using the sequence of input frames.

In some embodiments of the non-transient computer readable medium, the method further comprises identifying a Region Of Interest (ROI) of the input frame, the ROI including n columns of capacitive readings adjacent to the at least one edge of the touchscreen, n being an integer, and wherein the continuously detecting comprises detecting the user interaction using only the ROI of the input frame.

In some embodiments of the non-transient computer readable medium, the continuously detecting comprises; determining a sum of capacitive readings in the input frame; and in response to the sum of capacitive readings being above a pre-determined threshold, detecting the user interaction with the at least one edge of the electronic device.

In some embodiments of the non-transient computer readable medium, the input frame is a sequence of input frames, and wherein the continuously detecting comprises: determining a first sum of capacitive readings for a first input frame from the sequence; determining a second sum of capacitive readings for a second input frame from the sequence, the second input frame being sequential to the first input frame; and in response to a difference between the first sum and the second sum being above a pre-determined threshold, detecting the user interaction with the at least one edge of the electronic device.

In some embodiments of the non-transient computer readable medium, the method further comprises: acquiring explicit calibration data from the electronic device about a user of the electronic device; and adjusting the pre-determined threshold based on the explicit calibration data.

In some embodiments of the non-transient computer readable medium, the method further comprises: acquiring implicit calibration data from the electronic device about a user of the electronic device; and adjusting the pre-determined threshold based on the implicit calibration data.

In some embodiments of the non-transient computer readable medium, the method further comprises pre-processing the input frame by performing at least one of a filtering operation and a normalization operation, thereby generating a pre-processed input frame, and wherein the continuously detecting comprises detecting the user interaction using the pre-processed input frame.

In some embodiments of the non-transient computer readable medium, the continuously detecting comprises: generating a predicted class for the input frame using a classification model, the predicted class being indicative of the user interaction.

In some embodiments of the non-transient computer readable medium, the classification model is at least one of a Convolutional Neural Network (CNN) and a Recurrent Neural Network (RNN).

In some embodiments of the non-transient computer readable medium, the classification model is a binary classification model configured to classify the input frame as indicative of the user interaction, or otherwise not indicative of the user interaction.

In some embodiments of the non-transient computer readable medium, the classification model is a multi-class classification model configured to classify the input frame as indicative of a first type of user interaction, a second type of user interaction, a third type of user interaction.

In some embodiments of the non-transient computer readable medium, the predicted class is at least one of a squeezing state of touch, an un-squeezing state of touch, and a normal state of touch.

In some embodiments of the non-transient computer readable medium, the method comprises generating a hand model based on the capacitive readings, and wherein the continuously detecting comprises using the hand model to determine a hand pose, the hand pose being indicative of at least one of a location, size, and shape of the user interaction along the at least one edge of the device using the input frame.

In some embodiments of the non-transient computer readable medium, the method further comprises: generating a sequence of predicted classes for a sequence of input frames using a classification model; and determining a predicted gesture using the sequence of predicted classes.

In some embodiments of the non-transient computer readable medium, the predicted gesture is a sliding touch gesture.

In some embodiments of the non-transient computer readable medium, the determining the predicted gesture further comprises using an extracted feature from the input frame, the extracted feature being indicative of a location of the user interaction along the at least one edge of the device.

In some embodiments of the non-transient computer readable medium, the determining the predicted gesture further comprises using other sensor data from a non-capacitive sensor.

In some embodiments of the non-transient computer readable medium, the non-capacitive sensor is at least one of an Inertial Measurement Unit (IMU) sensor of the device and a barometer of the device.

In some embodiments of the non-transient computer readable medium, the method further comprises: in response to the continuously detecting, triggering one or more actions associated with the user interaction.

In some embodiments of the non-transient computer readable medium, the electronic device is a smartphone.

In some embodiments of the non-transient computer readable medium, the electronic device is a smartwatch.

In another aspect, embodiments of this disclosure provide a computer readable storage medium, comprising one or more instructions, wherein when the one or more instructions are run on a computer, the computer performs any of the methods disclosed herein.

In another aspect, embodiments of this disclosure provide a processor, configured to execute instructions to cause a device to perform any of the methods disclosed herein.

In another aspect, embodiments of this disclosure provide an integrated circuit configure to perform any of the methods disclosed herein.

According to one aspect of this disclosure, there is provided a module comprising: one or more circuits for performing any of the methods disclosed herein.

According to one aspect of this disclosure, there is provided an apparatus comprising: one or more processors functionally connected to one or more memories for performing any of the methods disclosed herein.

According to one aspect of this disclosure, there is provided an apparatus configured to perform any of the methods disclosed herein.

In some embodiments the apparatus comprises one or more units configured to perform the above-described method.

According to one aspect of this disclosure, there is provided one or more non-transitory, computer-readable storage media comprising computer-executable instructions, wherein the instructions, when executed, cause at least one processing unit, at least one processor, or at least one circuits to perform any of the methods disclosed herein.

According to one aspect of this disclosure, there is provided one or more computer-readable storage media storing a computer program, wherein, when the computer program is executed by an apparatus, the apparatus is enabled to implement any of the methods disclosed herein.

According to one aspect of this disclosure, there is provided a computer program product including one or more instructions, wherein, when the instructions are executed by an apparatus, the apparatus is enabled to implement any of the methods disclosed herein.

According to one aspect of this disclosure, there is provided a computer program, wherein, when the computer program is executed by a computer, an apparatus is enabled to implement any of the methods disclosed herein.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers. It can be said that a database is a logically ordered collection of structured data kept electronically in a computer system In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
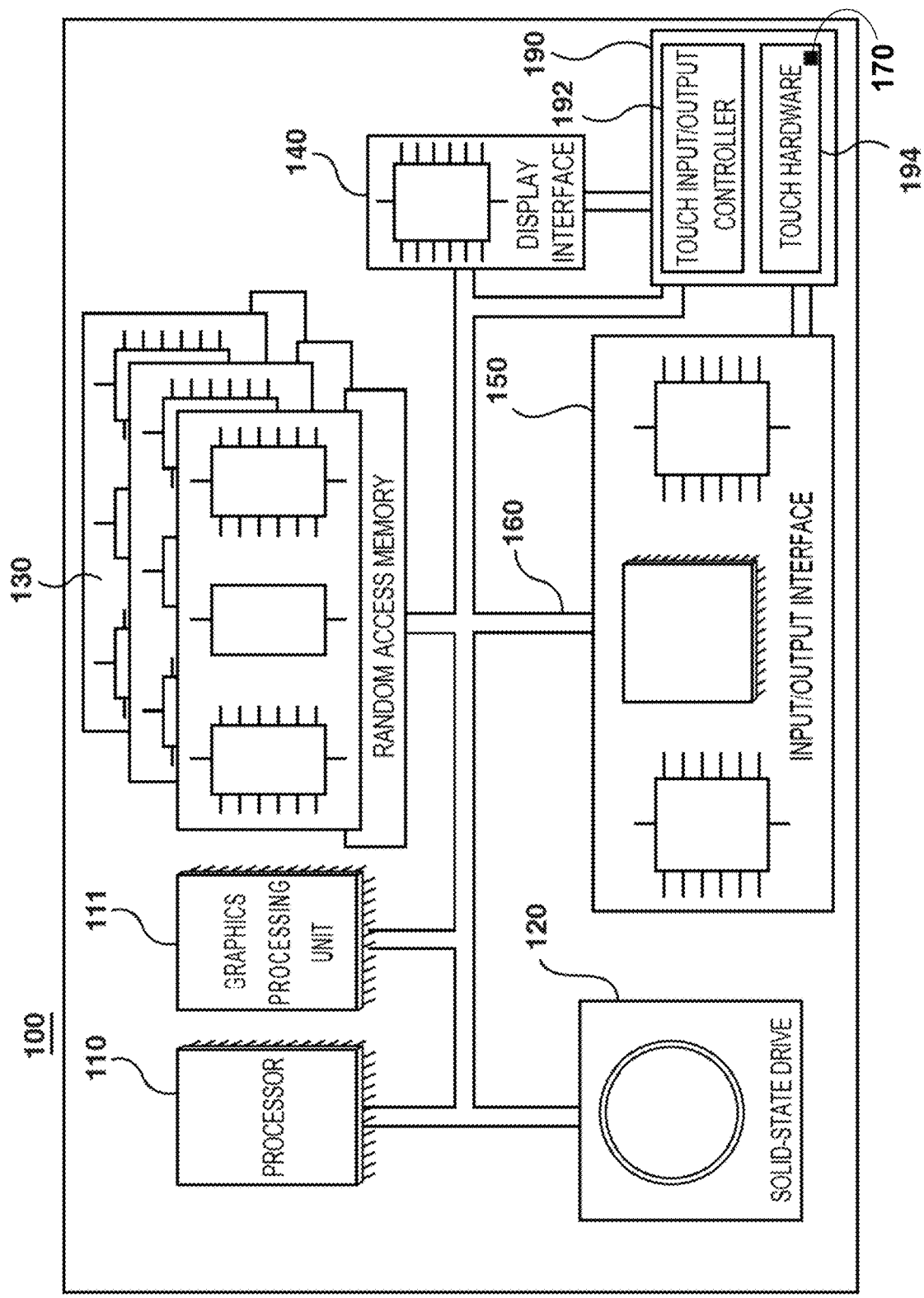
FIG. 1 illustrates an example of a computing device that may be used to implement any of the methods described herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

With reference to FIG. 1, there is depicted a computer system 100 suitable for use with some implementations of the present technology. The computer system 100 comprises various hardware components including one or more single or multi-core processors collectively represented by a processor 110, a graphics processing unit (GPU) 111, a solid-state drive 120, a random-access memory 130, a display interface 140, and an input/output interface 150.

According to implementations of the present technology, the solid-state drive 120 stores program instructions suitable for being loaded into the random-access memory 130 and executed by the processor 110 and/or the GPU 111. For example, the program instructions may be part of a library or an application.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may equally be referred to as a screen-such as a touchscreen 801 of a smartwatch 800 depicted in FIG. 8A, and/or of a touch screen 851 of a smartphone 850 depicted in FIG. 8B. It is noted some components of the computer system 100 can be omitted in some non-limiting embodiments of the present technology. For example, the keyboard and the mouse (both not separately depicted) can be omitted, especially (but not limited to) where the computer system 100 is implemented as a compact electronic device, such as the smartwatch 800 and/or the smartphone 850.

Broadly speaking, the touchscreen 190 may comprise touch hardware 194 and a touch input/output controller 192 allowing communication with the display interface 140 and/or the one or more internal and/or external buses 160.

In some embodiments, the touch hardware 194 may comprise pressure-sensitive cells embedded in a layer of a display allowing detection of a physical interaction between a user and the display. In the context of the present technology, the touch hardware 194 comprises one or more capacitive sensors 170. Broadly, capacitive sensors are sensors that can be operatively coupled to and/or integrated with touchscreens to detect changes in capacitance when a conductive object, such as a finger, for example, interacts with the touchscreen 190.

In some embodiments, the touchscreen 190 can be a surface capacitive screen that utilizes electrodes on the screen's surface to capture capacitive readings and may increase durability of the computer system 100.

In other embodiments, the touchscreen 190 can be a projected capacitive touchscreen with electrodes embedded beneath layers of glass and/or plastic and may provide enhanced sensitivity and multitouch functionality. Projected capacitive touchscreens are prevalent in consumer electronics due to their superior performance, resistance to environmental factors, and widespread adoption in applications like smartphones, tablets, smart-watches, and laptops.

Figure 8B:
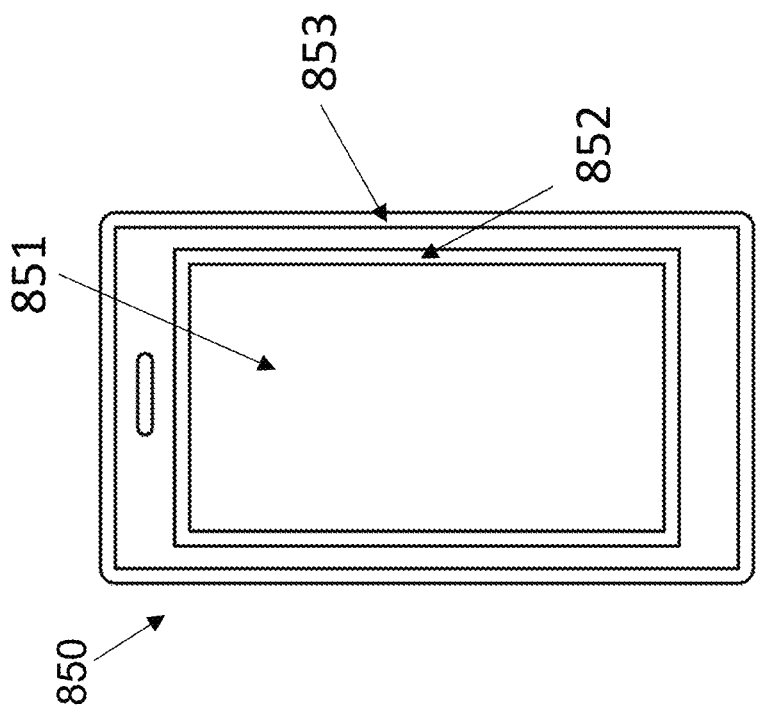
FIG. 8B illustrates a smartphone device including at least some components of the computing device.
Figure 8A:
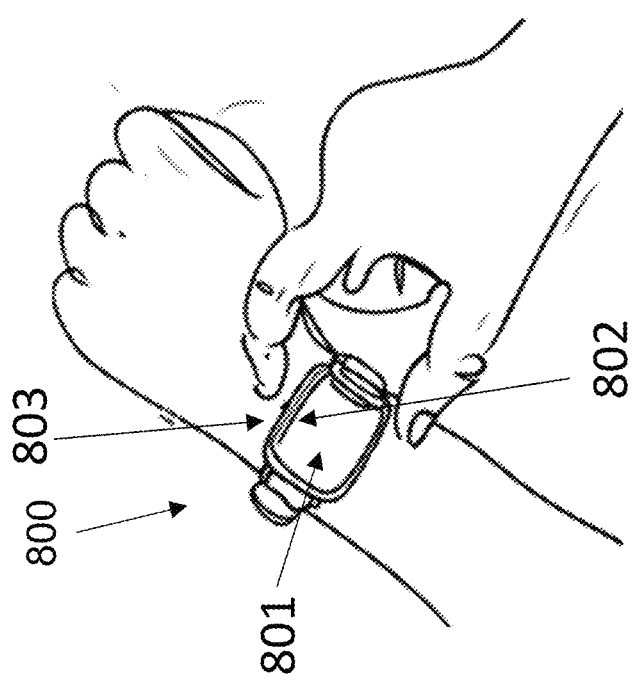
FIG. 8A illustrates a wearable electronic device including at least some components of the computing device.

With reference to FIGS. 8A and 8B, there is depicted two non-limiting embodiments of the computer device 100 as electronic devices, and more specifically, as the smartwatch 800 and as the smartphone 850. In one non-limiting example of the present technology, the smartphone 850 may be implemented as a Huawei Mate™ 60 smartphone released in 2023.

The touchscreen 801 of the smartwatch 800 and/or the touchscreen 851 of the smartphone 850 comprise respective capacitive sensors (such as, the capacitive sensor 170, for example). For instance, the capacitive sensor 170 may be integrated to enable touch input and gesture recognition on the touchscreens of the smartwatch 800 and/or the smartphone 850. For instance, when a user taps or swipes his/her finger on the smartphone 850, the capacitive sensor 170 can detect the change in capacitance caused by the touch. The capacitive sensor 170 may be used by the processor 110 to detect nearby objects or hands to the smartwatch 800 and/or the smartphone 850. For example, when a user brings the corresponding device to his/her ear during a call, the processor 110 may trigger the screen to automatically dim based on data captured by the capacitive sensor 170. In other embodiments, the capacitive sensor 170 may be implemented as a capacitive button for replacing physical buttons, providing a sleek and responsive interface. For example, the device may be implemented exclusively with touch-sensitive buttons instead of traditional mechanical ones. At least some functionalities of the capacitive sensor 170 in the context of the present technology will be described in greater details herein further below.

In one embodiment, as seen In FIG. 8A, capacitive readings from a capacitive sensor of the touchscreen 801 may be used to detect user interactions with the touchscreen 801. Also, capacitive readings along an edge 802 of the touchscreen 801 may be used to detect user interactions with an edge 803 of the smartwatch 800.

In another embodiment, as seen In FIG. 8B, capacitive readings from a capacitive sensor of the touchscreen 851 may be used to detect user interactions with the touchscreen 851. Also, capacitive readings along an edge 852 of the touchscreen 851 may be used to detect user interactions with an edge 853 of the smartphone 800.

In some embodiments, there is provided a touchscreen electronic device comprising inter alia a capacitive sensor configured to collect capacitive readings on a corresponding touchscreen and to inter alia detect interactions with the touchscreen. As it will become apparent from the description herein further below, developers have devised methods and electronic devices where capacitive readings from a capacitive sensor are used, not only to detect a user interaction with the touchscreen, but to also detect a user interaction with the electronic device itself, and more particularly with an edge of the electronic device.

It is contemplated that the capacitive data from a touchscreen can be employed to detect one or more states of touch performed by a user on one or more edges of a given electronic device, such as "squeezing" state and "un-squeezing" state. However, capacitive data from the touchscreen can be employed to detect one or more gestures based on a sequence of determined touch states as it will be described below in greater detail.

Figure 2:
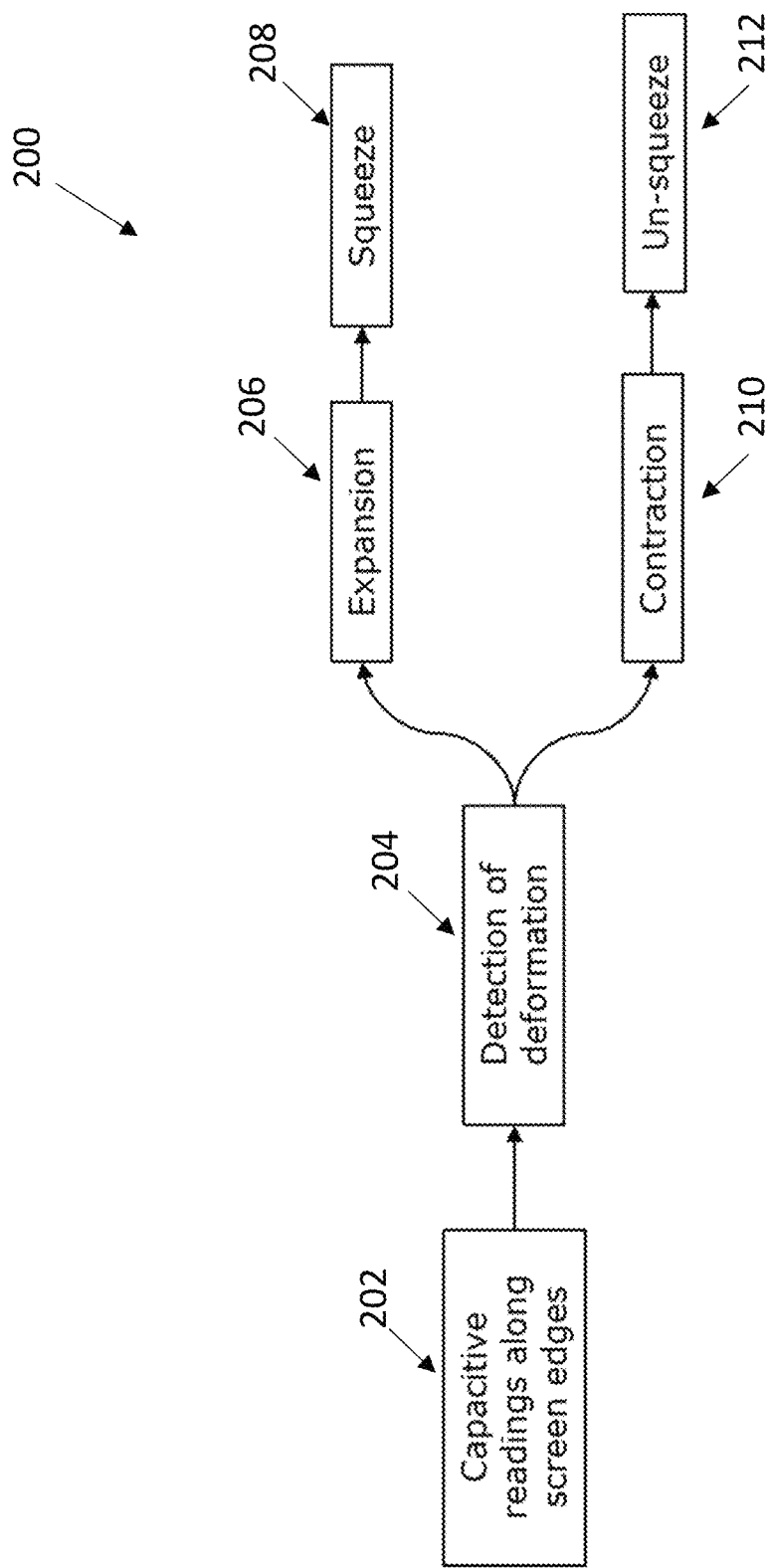
FIG. 2 illustrates a processing pipeline executed by a processor of the computing device of FIG. 1, in some embodiments of the present technology.

In some embodiments of the present technology, there is provided methods and electronic devices for detecting a user interacts with edges of the touchscreen 190. With reference to FIG. 2, there is depicted a representation of a processing pipeline 200 executable by the processor 110 of the electronic device 100.

In this embodiment, the processor 110 is configured to acquire capacitive readings 202 along screen edges from the capacitive sensor 170. The capacitive readings 202 are included in a Region Of Interest (ROI) of an input frame provided by the capacitive sensor 170. The input frame may be in a form of a 2D array of capacitive readings arranged in rows in columns.

In this embodiment, the processor 110 is configured to execute a detection step 204 onto capacitive readings 202 to detect whether the capacitive readings 202 are deforming/changing. In some embodiments, at step 206, the processor 110 is configured to identify that the capacitive readings are expanded/increased. In these embodiments, at step 208, the processor 110 is configured to determine that the user is currently performing a "squeezing" interaction (a first class of touch states) on one or more edges of the electronic device 100. In other embodiments, at step 210, the processor 110 is configured to identify that the capacitive readings 202 are contracted/reduced. In these other embodiments, at step 212, the processor 110 may determine that the user is currently performing an "un-squeezing" interaction (a second class of touch states) on the electronic device 100.

Squeezing and/or un-squeezing touch states may be detectable by the processor 110 for triggering one or more actions associated with the corresponding touch states. At least some of the actions triggerable by the processor 110 will be described in greater detail herein further below.

Figure 3:
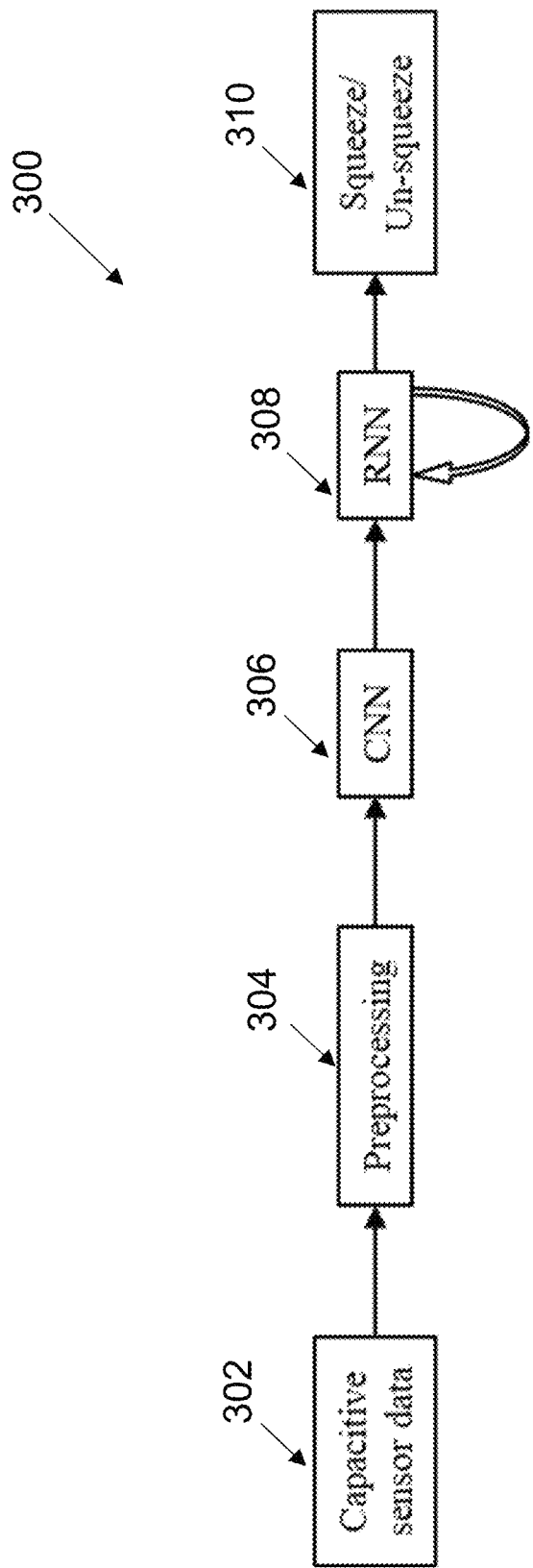
FIG. 3 illustrates another processing pipeline executed by the processor, in some embodiments of the present technology.

With reference to FIG. 3, there is depicted a representation of a processing pipeline 300 executable by the processor 110 in other non-limiting embodiments of the present technology. The processing pipeline 300 includes use of Machine Learning Algorithms (MLAs), such as a Convolutional Neural Network 306, and a Recurrent Neural Network 308, for example.

Broadly speaking, CNNs are a type of neural network that preserve the spatial structure of the problem and have been developed to deal with large inputs, such as 2D images, for example. CNNs use convolutional layers, which apply filters to the input data to extract features, and pooling layers, which reduce the dimensionality of the data while retaining important information. Developers have realized that the CNN 306 is a potential candidate for the processing pipeline 300 because of the CNN 306 is configured to receive 2D data, such as 2D array data provided by a given capacitive sensor.

Broadly speaking, RNNs are a type of neural network where the output from the previous step is fed as input to the current step. This allows RNNs to maintain an internal state, or memory, of previous inputs, making them well-suited for tasks where the context is important, such as time series analysis. Developers have realized that the RNN 308 is a potential candidate for the processing pipeline 300 because of the RNN 308 is configured to receive a sequence of data, such as a temporal sequence of 2D array data provided by a given capacitive sensor.

In this embodiment, the processor 110 is configured to acquire capacitive sensor data 302. It is contemplated that the capacitive sensor data 302 may include a sequence of input frames generated by a given capacitive sensor, and where each frame is associated with a corresponding timestamp.

In this embodiment, the processor 110 is configured to performed one or more pre-processing operations 304 in order to pre-process the capacitive sensor data 302. Different pre-processing steps may be executed as part of the pre-processing operations 304.

In some embodiments, during pre-processing, the processor 110 may identify an ROI in a given input frame. The ROI for edge interaction detection may include n columns in the capacitive touch array along the edge of the corresponding electronic device. It should be noted that n can be equal to one or more, depending on a pre-determined interaction and pitch of capacitive sensor. In one implementation, for a given capacitive sensor with a pitch of about 4 mm, the ROI may include 2 columns along each edge of the corresponding electronic device. It should be noted that a self-capacitance touch surface may comprise 'rows' and 'columns' of electrodes. In this case, horizontal and vertical sensor pitches may refer to the distances between columns and rows of electrodes, respectively.

In other embodiments, during pre-processing, the processor 110 may be configured to perform one or more filtering operations on the capacitive sensor data 302. In one implementation, the processor 110 may be configured to remove noise from the capacitive sensor data 302 by passing the capacitive data through a High Pass filter.

In further embodiments, during pre-processing, the processor 110 may be configured to normalize values in the ROI. Normalization may include removing bias values and dividing capacitive readings by a scaling factor. It is contemplated that bias and scale values can be pre-determined based on values received from the capacitive sensor. It is contemplated that the bias and scale values can also be dynamically determined to have "0" mean and unit standard deviation in data.

As seen in FIG. 3, output of the pre-processing operations 304 (i.e., one or more pre-processed input frames) is fed to the CNN 306. As mentioned above, CNN architecture may be selected in some implementations for processing the pre-processed input frames as they are in a form of a 2D array of pre-processed data. In some embodiments of the present technology, it is contemplated that the CNN 306 may be used to extract one or more features from the pre-processed data. Pre-processing operations 304 may comprise steps such as normalization and removal of noise, for example. However, the CNN 306 may be used to supplement the overall information in the pre-processed data. To that end, the CNN 306 may learn to extract additional information and generate a dense feature vector. Since the input is a 2D Array, CNN 206 may be well suited for extracting additional features to used downstream in the processing pipeline.

In this embodiment, output of the CNN 306 is fed to the RNN 308, in addition to or instead of the output of the pre-processing operations 304. As mentioned above, the RNN 308 may be used for determining a temporal relationship between respective pre-processed input frames. The RNN 308 may be used to take into account a change in sequential instances of 2D capacitive data fed to the RNN 308 in a form of a sequence of pre-processing input frames. Additionally or optionally, a Long Short-Term Memory (LSTM) architecture may be used instead of a RNN architecture, without departing from the scope of the present technology.

In this embodiment, output of RNN 308 may be a classification output 310 such as "squeeze" class or "un-squeeze" class. In other embodiments the RNN 308 may generate a classification output such as "squeeze" class or "normal" class. In these embodiments, the RNN 308 is a binary classifier however this might not be the case in each and every embodiment of the present technology.

In other embodiments, it is contemplated that the RNN 308 may be a multi-class classifier configured to generate a classification output indicative of a "squeeze" class, "un-squeeze" class, "normal" class, and so forth. In some embodiments, the RNN may be a multi-class classifier configured to classify capacitive data as being from a plurality of classes, each associated with a respective type of touch state of one or more edges of the electronic device. It can be said that the RNN 308 may be configured to predict, for a given input frame, whether the input frame is associated with a squeezing state of touch, un-squeezing state of touch, and/or a normal state of touch.

It is contemplated that to train the RNN 308 to estimate a class, data may be collected from various users to create a training set based on behavior from a variety of users. During the data collection, users can be prompted to hold the electronic device normally and/or to squeeze the electronic device, for example. Using data from real users may be used to ensure that features of human behavior are captured by the model. The RNN 308 can be trained on labeled data where a given training frame from a sequence of training frames is labeled with data indicative of whether the given training frame is associated with a squeeze state, an un-squeeze state, and/or any other user specific state of touch associated with the edge of the electronic device 100. It is contemplated that the CNN 306 and RNN 308 may be executed locally on the electronic device 100.

Figure 4:
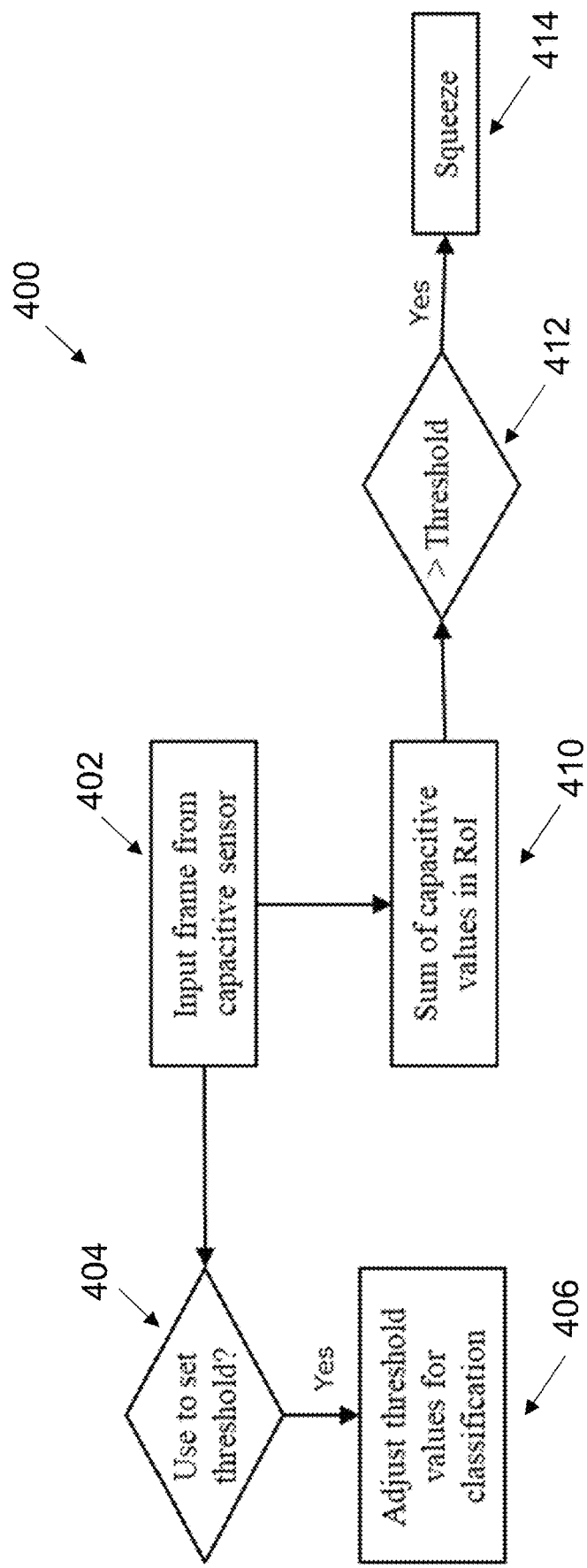
FIG. 4 illustrates a flowchart of a method of performing squeeze state detection using sum of values in a Region Of Interest (ROI) by the processor in accordance with a first embodiment of the present technology.

With reference to FIG. 4, there is depicted a flow-chart of a method 400, in accordance with a first embodiment of the present technology. The processor 110 is configured to acquire an input frame 402 from the capacitive sensor 170. The processor 110 is configured to determine a sum of capacitive values 410 in the ROI of the input frame 402. If the sum of capacitive values 410 is above a pre-determined threshold 412, the processor 110 is configured to detect a squeeze state 414. If the sum of capacitive values 410 is below the pre-determined threshold 412, the processor 110 is configured to detect an un-squeeze state, or otherwise detect that the user is not performing the squeeze state 414.

The processor 100 executing the method 400 is configured to use the sum of capacitive values 410 in a given ROI to detect the squeeze state 414. Developers have realized that the sum of capacitive values of "active" pixels (i.e pixels covered by hand/finger holding the phone) may be correlated with an area of the edge of the electronic device 100 under touch. Whenever the hand squeezes against the edges, the part of hand in contact with the edges/screen becomes comparatively larger (expands), and this can be detected based on the sum of capacitive values near the touched area. It is contemplated that the change in a sum of values in ROI between different frames may be indicative of a given squeeze state.

In this embodiment, the processor 100 may be configured to calibrate or update the pre-determined threshold 412 based on a set of previous input frames from the capacitive sensor 170. For example, one or more input calibration frames may be used to determine whether a new/updated threshold is to be set at step 404. Then, based on the one or more input calibration frames, the processor 110 may be configured to update the pre-determined threshold 412 at step 406. The set of calibration frames may be associated with different calibration interactions, during which the decision boundaries can be determined based on distribution of values among both normal and squeeze states. For example, the values corresponding to squeeze state or normal state may be assumed to be defined by parametric distributions (like normal distributions, for example). The parameters of these distributions (mean and variance in case of normal distribution) can be determined using methods like Maximum Likelihood Estimation and Maximum a Posteriori estimation. Once determined, the parameters can be used by the processor 110 to determine the decision boundaries or thresholds for normal state and/or squeeze state.

Figure 5:
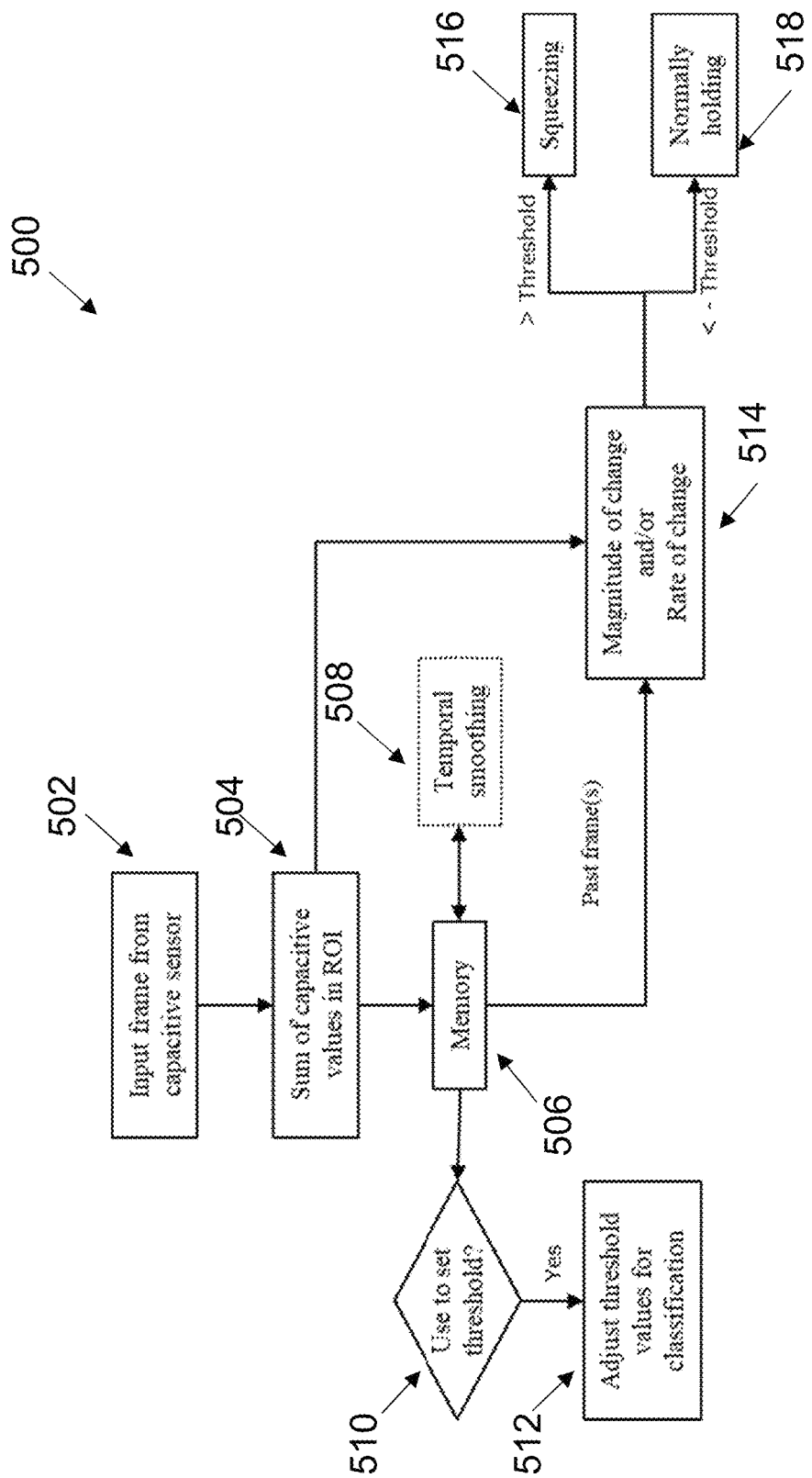
FIG. 5 illustrates a flowchart of a method of performing squeeze state detection using change of sum of values in ROI by the processor in accordance with a second embodiment of the present technology.

With reference to FIG. 5, there is depicted a flowchart of a method 500 in accordance with a second embodiment of the present technology. In this embodiment, the processor 100 is configured to use a change of a sum of capacitive values in ROI to classify state of touch (an intended interaction). The processor 110 is configured to receive an input frame 502 from the capacitive sensor 170. The processor 110 is configured to determine a sum of capacitive values 504 in the ROI of the input frame 502. The processor 110 is configured to store the sum of capacitive values 504 in memory 506.

It is contemplated that a sequence of input frames may be provided to the processor 110 and a respective sum of capacitive values in respective ROIs of the corresponding ones from the sequence of input frames may be determined by the processor 110 and provided to the memory 506. In some embodiments, the processor 110 may be configured to execute a temporal smoothing operation 508 onto the sequence of sums of capacitive values for the sequence of input frames.

In this embodiment, the processor 110 may use the sum of capacitive values 504 and one or more sums of capacitive values from ROIs of one or more previously inputted frames to determine a magnitude of change 514 in the sum of capacitive values including (i) the sum of capacitive values 504 and (ii) the one or more sums of capacitive values from ROIs of one or more previously inputted frames. The processor 110 may be configured to compare the magnitude of change 514 to a pre-determined magnitude threshold to determine whether a squeezing state 516 is detected or if a normal state is detected.

In other embodiments, the processor 110 may use the sum of capacitive values 504 and one or more sums of capacitive values from ROIs of one or more previously inputted frames to determine a rate of change in the sum of capacitive values, in addition to or instead of, the magnitude of change 514, without departing from the scope of the present technology. In these other embodiments, the processor 110 may be configured to compare the rate of change to a pre-determined rate threshold, in addition to or instead of comparing a magnitude of change to a pre-determined magnitude threshold, to determine whether a squeezing state 516 is detected or if a normal state is detected, without departing from the scope of the present technology.

Developers have realized that the squeeze state 516 can be detected based on a change of a sum of capacitive values in ROI within a given sequence of input frames. For example, when user's hand squeezes the electronic device 100, the change in magnitude of the sum of capacitive values along edges is high and positive. When the interaction transitions from squeezing to a normal holding of the electronic device 100, the change in values is high and negative. When the interaction transitions from normal holding to squeezing, the rate of change is high and positive. When the interaction transitions from squeezing to normal holding, the rate of change is high and negative. The rate of change of these values can be used to detect a squeeze state, an un-squeeze state, normal state, and/or other states.

In this embodiment, the pre-determined magnitude threshold can be determined and/or updated based on a set of frames from a calibration interaction. For example, the processor 110 may use one or more input calibration frames, and/or one or more sums of capacitive values from ROIs of the one or more input calibration frames to set a new "updated" magnitude threshold at step 510. The processor 110 may be configured to adjust a current magnitude threshold at step 512. Over time within a calibration interaction, the decision boundaries can be determined based on distribution of values among normal holding, squeezing, and/or un-squeezing states, for example. The values corresponding normal holding, squeezing, and/or un-squeezing states, can be assumed to be defined by parametric distributions (like normal distributions). These distributions can be multivariate and can be modeled by both the change in magnitude of values and/or rate of change in these values. The parameters of these distributions (mean and variance in case of normal distribution) can be determined using methods like Maximum Likelihood Estimation and Maximum a Posteriori estimation. Once determined, the parameters can be used by the processor 110 to determine the decision boundaries and/or thresholds for normal holding, squeezing, and/or un-squeezing states.

Figure 6:
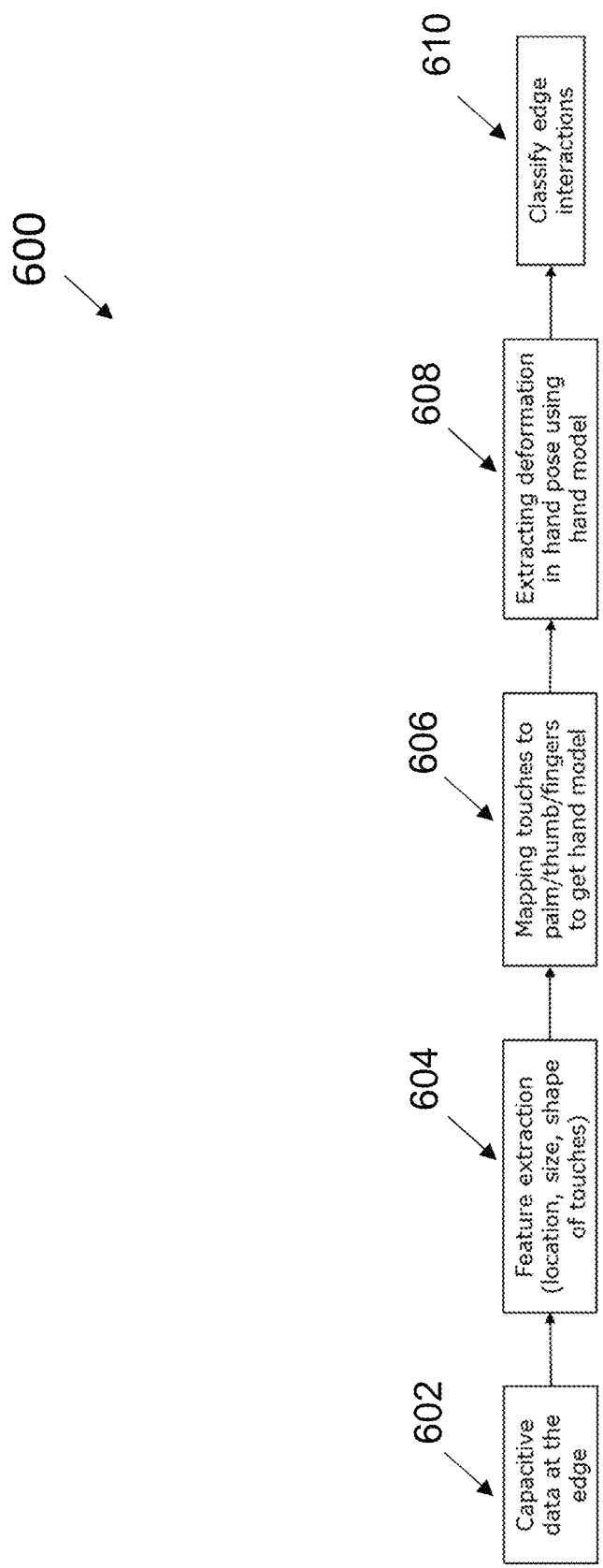
FIG. 6 illustrates a flowchart of a method of performing classification of edge interactions via hand model estimation by the processor, in accordance with a third embodiment of the present technology.

With reference to FIG. 6, there is depicted a flowchart of a method 600 executed by the processor 110 for estimating a given hand model of a given user based on capacitive data received from the capacity sensor of a corresponding electronic device. The processor 110 may acquire capacitive data 602 from ROI of input frames.

The processor 110 may be configured to extract features 604 based on the capacitive data 602. The features may include location, size, and "shape" of touches performed by a specific user. The processor 110 may be configured to map touches to palm and/or thumb and/or finger(s) of a specific user to generate the hand model 606. The processor 110 may be configured to extract deformation data 608 in hand pose using the hand model 606. The processor 110 may then use the deformation data 608 to classify a given edge interaction.

In some embodiments, the processor 110 may be configured to use capacitive data and one or more extracted features to determine the hand model 606. The processor 110 may then determine the hand pose (for example by using PnP algorithm) and/or deformation in the hand model 606. It should be noted that the deformation is used to predict squeeze and/or other edge interactions. Knowing the pose of hand allows to set corresponding gesture actions to different fingers. For example, the action associated with thumb movement can be different from first finger movement.

Developers have realized that size, shape and elasticity of fingers and palm vary among different users. As a result, touch behavior among different users varies as well. In some embodiments, the processor 110 may allow a given user to explicitly calibrate one or more interaction detection methods described herein for their specific hand and/or specific touch behavior.

In at least some embodiments, the processor 110 may be configured to execute a calibration procedure by prompting the specific user to perform one or more of the following sampling/calibration interactions: an instance of "normally" holding the electronic device 100, an instance of "squeezing" the electronic device, an instance of a "normal" touch that transitions into a "squeeze" (with or without indication for transition), an instance of a "squeeze" that transitions into a "normal" touch (with or without indication for transition), and the like.

It is contemplated that the sampling/calibration interactions provided by the specific user can be used by the processor 110 to (i) update one or more threshold values or decision boundaries for classification purposes, (ii) perform few-shot learning-based update approach for one or more NNs used for classification purposes, (iii) perform nearest neighbor search for new touch against sample touches, and (iv) update distribution of classes. It is contemplated that the distribution of gestures can evolve over time to adjust decision boundaries.

In other embodiments, the processor 110 may allow a given user to implicitly calibrate one or more interaction detection methods described herein for their specific hand and/or specific touch behavior. Developers have realized that over time, the behavior for holding a given electronic device can be analyzed by the processor 110 to update the distributions for normal holding vs squeezing states. In other words, historical data about user behavior implicitly collected (without necessarily being explicitly prompted to provide calibration data) for a given device-user pair may be used to calibrate interaction detection methods and systems described herein.

For example, a user's touch can be recorded as a correct state of touch (normal/squeeze) if there is no additional measure taken to rectify the triggered action and vice versa. Moreover, some information can be extracted based on a task being performed by the specific user or from an application being used by the specific user. For example, while running, the specific user is likely to hold the electronic device tightly.

Implicit sampling/calibration data may be collected from the specific user to: (i) update one or more threshold values or decision boundaries for classification purposes, (ii) perform few-shot learning-based update approach for one or more NNs used for classification purposes, (iii) perform nearest neighbor search for new touch against sample touches, and (iv) update distribution of classes. It is contemplated that the distribution of touches can evolve over time to adjust decision boundaries.

It is contemplated that a given squeeze gesture can be used as a "button without a button" available to the user while interacting with the electronic device 100. For example, the squeeze state may be mapped by the processor 110 to a given function or action to be triggered (for example, launching a virtual assistant). Optionally, the squeeze state may be configured to different actions in different scenarios. In one scenario, if the camera app is launched, a squeeze state may be used as a button to capture picture (even when you are facing the back of the electronic device). In another scenario, if a meeting app is launched, the squeeze state may be used as a push to talk action. In a further scenario, if the device receives an incoming call, the squeeze state may be sued to silence notifications regarding the incoming call.

Alternatively, the squeeze state can be detected and used to trigger one or more actions even when the screen is off. The squeeze state can be combined with time information and other detectable interactions. For example, detectable interactions such as long squeeze and double squeeze can be configured similarly to long touch and double tap, without departing from the scope of the present technology.

Figure 7:
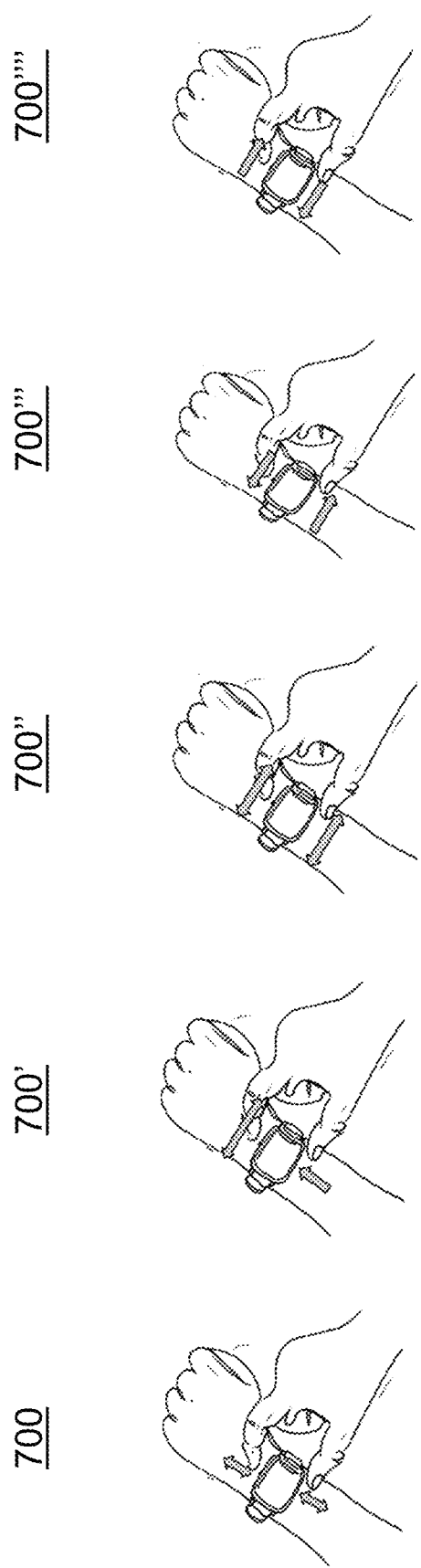
FIG. 7 illustrates examples of user gestures performed on a wearable electronic device, in accordance with a seventh embodiment of the present technology.

With reference to FIG. 7, there is depicted a series of gestures a user may perform on a given electronic device in the context of at least some embodiments of the present technology. It should be noted that information about a given touch state, such squeeze, un-squeeze, normal holding, for example, along one or more edges of the electronic device can be combined with location information of one or more touch states along the one or more edges as well as with a temporal relationship between the one or more touch states to define one or more gestures. A first gestures 700 represents an interaction where the user is squeezing both edges of the smartwatch 850 simultaneously. A second gesture 700' represents an interaction where the user is squeezing one edge and slides a finger along the opposite edge. A third gesture 700" represents an interaction where the user is sliding fingers in the same direction along opposite edges. A fourth and fifth gestures 700''' and 700'''' represent interactions where the user is sliding fingers in different directions along opposite edges for example from top to bottom on one edge and bottom to top on the other edge.

In some embodiments, a squeeze state detection may be combined with a particular location of squeeze interaction along an edge. In these embodiments, the processor 110 may be configured to trigger an action (such as volume up, for example) based on a combination of a squeeze state with a "slide-up" sequence for volume-up etc. In other embodiments, the processor 110 may be configured to trigger an action based on a combination of a finger sliding along edge/circumference clockwise, counterclockwise or in same direction with 2 fingers. In other embodiments, the processor 110 may be configured to trigger an action based on a combination of interactions like hold one edge and tap on the other edge.

In other embodiments, the processor 110 may be configured to trigger an action based on a combination of tapping interactions at different locations along edges. For example, tapping when one finger is at the bottom left corner and another at top right corner is a different gesture than when the other finger is in the bottom right corner. For example, one of the gestures could map to "next song" and another gesture could map to "previous song".

In further embodiments of the present technology, the processor 110 may be configured to combine edge interaction data with data from other sensors. For example, the processor 110 may be configured to combine detection data with other modalities present on the electronic device 100 to help trigger a given interaction detection with more robustness. For example, the electronic device 110 may supplement interaction detection methods described herein using capacitive data with data from other sensors including but not limited to IMU sensor and/or a barometer to trigger an action. For example, a squeeze state can be detected only when the electronic device 100 is in a certain orientation and/or when it is relatively stable in hand to avoid inadvertently triggering one or more actions associated with the squeeze state.

Figure 9:
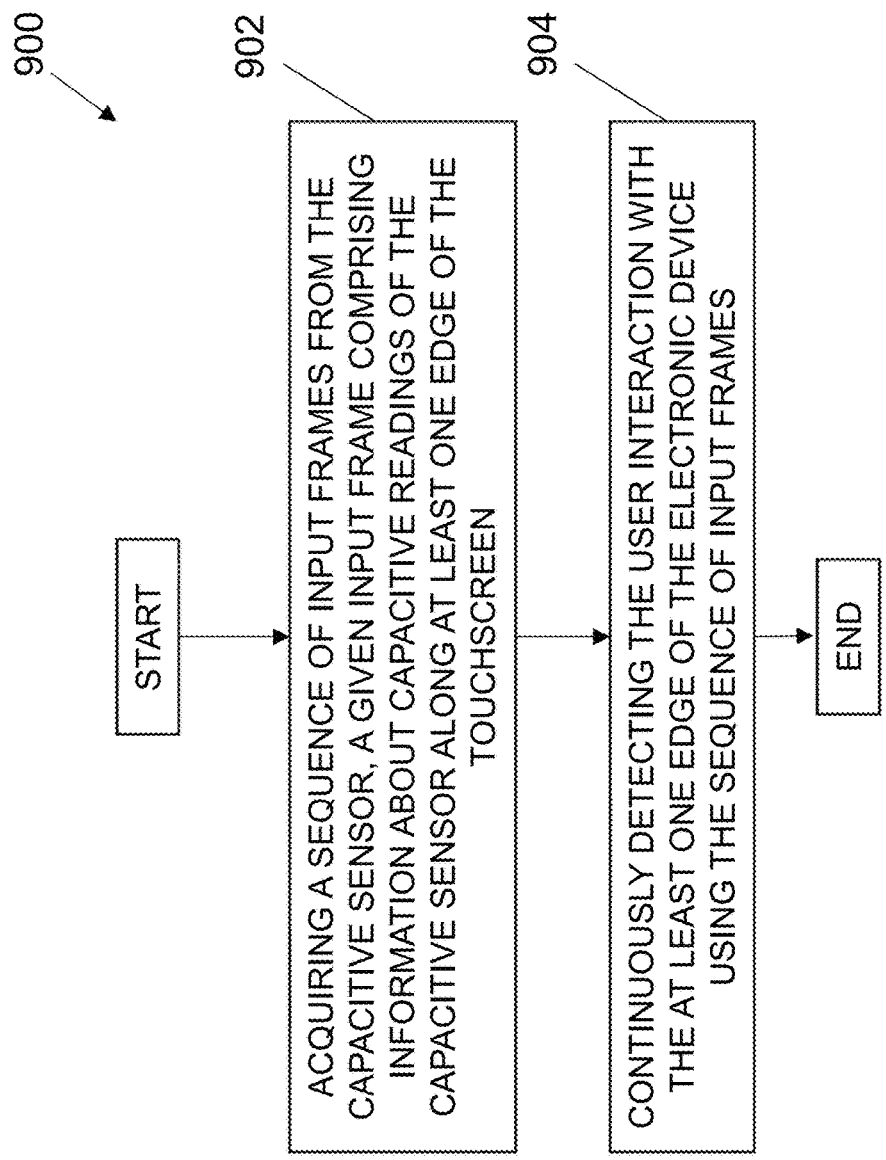
FIG. 9 is a scheme-block illustration of a method executed by the processor, in accordance with at least some non-limiting embodiments of the present technology.

With reference to FIG. 9, there is depicted a scheme-block illustration of a method 900 executable by the electronic device 100 with the processor 110. Various steps of the method 900 will now be described.

At step 902, the processor 110 is configured to acquire a sequence of input frames from the capacitive sensor, a given input frame comprising information about capacitive readings of the capacitive sensor along an edge of the touchscreen.

In some embodiments, the processor 110 is configured to continuously monitor for the user interaction using the sequence of input frames. It is contemplated that an iterative process may be executed by the processor 110 using one or more most current input frames provided by the capacitive sensor.

In other embodiments, the processor 110 may be configured to identify a Region Of Interest (ROI) of the input frame, where the ROI includes n columns of capacitive readings adjacent to the edge of the touchscreen, n being an integer. In these embodiments, one or more detection operations may be performed using only the ROI of the input frame and/or of the sequence of input frames.

At step 904, the processor 110 is configured to continuously detect the user interaction with the edge of the electronic device using the sequence of input frames.

In some embodiments, the processor 110 may be configured to continuously detect a current state of the user interaction using the sequence of input frames.

In some embodiments, during the step 904, the processor 110 may be configured determine a sum of capacitive readings in the input frame; and in response to the sum of capacitive readings being above a pre-determined threshold, detect the user interaction with the edge of the electronic device. In other embodiments, the input frame is a sequence of input frames, and the processor 110 may be configured to determine a first sum of capacitive readings for a first input frame from the sequence, and determine a second sum of capacitive readings for a second input frame from the sequence, the second input frame being sequential to the first input frame, and in response to a difference between the first sum and the second sum being above a pre-determined threshold, detecting the user interaction with the edge of the electronic device.

It is contemplated that the processor 110 may acquire at least one of explicit and implicit calibration data from the electronic device about a user of the electronic device and adjust the pre-determined threshold based on the explicit calibration data.

In further embodiments, the processor 110 may be configured to pre-process the input frame by performing at least one of a filtering operation and a normalization operation, thereby generating a pre-processed input frame. The pre-processed input frame may be used by the processor 110 during the step 904.

In some embodiments, the processor 110 may be configured to generate a predicted class for the input frame using a classification model, the predicted class being indicative of the user interaction. For example, the classification model may be at least one of a Convolutional Neural Network (CNN) and a Recurrent Neural Network (RNN). In another example, the classification model is a binary classification model configured to classify the input frame as indicative of the user interaction, or otherwise not indicative of the user interaction. In an additional example, the classification model is a multi-class classification model configured to classify the input frame as indicative of a first type of user interaction, a second type of user interaction, a third type of user interaction. In a further example, the predicted class is at least one of a squeezing state of touch, an un-squeezing state of touch, and a normal state of touch. In yet another example, the classification model is a hand model configured to predict at least one of a location, size, and shape of the user interaction along the edge of the device using the input frame.

It is contemplated that the processor 110 may generate a sequence of predicted classes for a sequence of input frames using a classification model and determine a predicted gesture using the sequence of predicted classes. For example, the predicted gesture is a sliding touch gesture.

In further embodiments, the processor 110 may use an extracted feature from the input frame, such as a location of the user interaction along the edge of the device, for example, for classifying the user interaction. Optionally, other sensor data from a non-capacitive sensor(s) may be used by the processor 110. For example, the processor may make use of data generated by an IMU sensor and/or a barometer of the device.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of detecting a user interaction with at least one edge of an electronic device, the electronic device comprising a touchscreen with a capacitive sensor and a processor, the method executable by the processor, the method comprising:
    acquiring a sequence of input frames from the capacitive sensor, a given input frame comprising information about capacitive readings of the capacitive sensor along the at least one edge of the touchscreen; and
    continuously detecting the user interaction with the at least one edge of the electronic device using the sequence of input frames.

2. The method of claim 1, wherein the method further comprises identifying a Region Of Interest (ROI) of the input frame, the ROI including n columns of capacitive readings adjacent to the at least one edge of the touchscreen, n being an integer, and wherein the continuously detecting comprises detecting the user interaction using only the ROI of the input frame.

3. The method of claim 1, wherein the continuously detecting comprises:
    determining a sum of capacitive readings in the input frame; and
    in response to the sum of capacitive readings being above a pre-determined threshold, detecting the user interaction with the at least one edge of the electronic device.

4. The method of claim 3, wherein the method further comprises:
    acquiring calibration data from the electronic device about a user of the electronic device; and
    adjusting the pre-determined threshold based on the calibration data.

5. The method of claim 1, wherein the continuously detecting comprises:
    determining a first sum of capacitive readings for a first input frame from the sequence;
    determining a second sum of capacitive readings for a second input frame from the sequence, the second input frame being sequential to the first input frame; and
    in response to a difference between the first sum and the second sum being above a pre-determined threshold, detecting the user interaction with the at least one edge of the electronic device.

6. The method of claim 1, wherein the method further comprises pre-processing the input frame by performing at least one of a filtering operation and a normalization operation, thereby generating a pre-processed input frame, and wherein the continuously detecting comprises detecting the user interaction using the pre-processed input frame.

7. The method of claim 1, wherein the continuously detecting comprises:
    generating a predicted class for the input frame using a classification model, the predicted class being indicative of the user interaction.

8. The method of claim 7, wherein the classification model is at least one of a Convolutional Neural Network (CNN), a Recurrent Neural Network (RNN),
    a binary classification model configured to classify the input frame as indicative of the user interaction, or otherwise not indicative of the user interaction and
    a multi-class classification model configured to classify the input frame as indicative of a first type of user interaction, a second type of user interaction, a third type of user interaction.

9. The method of claim 8, wherein the predicted class is at least one of a squeezing state of touch, an un-squeezing state of touch, and a normal state of touch.

10. The method of claim 1, wherein the method comprises generating a hand model based on the capacitive readings, and wherein the continuously detecting comprises using the hand model to determine a hand pose, the hand pose being indicative of at least one of a location, size, and shape of the user interaction along the at least one edge of the device using the input frame.

11. The method of claim 1, wherein the method further comprises:
    generating a sequence of predicted classes for the sequence of input frames using a classification model; and
    determining a predicted gesture using the sequence of predicted classes.

12. The method of claim 11, wherein the predicted gesture is a sliding touch gesture.

13. The method of claim 11, wherein the determining the predicted gesture further comprises using an extracted feature from the input frame, the extracted feature being indicative of a location of the user interaction along the at least one edge of the device.

14. The method of claim 1, wherein the method further comprises:
    in response to the continuously detecting, triggering one or more actions associated with the user interaction.

15. An electronic device for detecting a user interaction with at least one edge of the electronic device, the electronic device comprising a touchscreen with a capacitive sensor and a processor, the processing being configured to:
    acquire a sequence of input frames from the capacitive sensor, a given input frame comprising information about capacitive readings of the capacitive sensor along the at least one edge of the touchscreen; and
    continuously detect the user interaction with the at least one edge of the electronic device using the sequence of input frames.

16. The electronic device of claim 15, wherein the processor is further configured to identify a Region Of Interest (ROI) of the input frame, the ROI including n columns of capacitive readings adjacent to the at least one edge of the touchscreen, n being an integer, and wherein the continuously detecting comprises detecting the user interaction using only the ROI of the input frame.

17. The electronic device of claim 15, wherein to continuously detect comprises the processor configured to:
    determine a sum of capacitive readings in the input frame; and
    in response to the sum of capacitive readings being above a pre-determined threshold, detect the user interaction with the at least one edge of the electronic device.

18. The electronic device of claim 17 wherein the processor is further configured to:
    acquire calibration data from the electronic device about a user of the electronic device; and
    adjust the pre-determined threshold based on the calibration data.

19. The electronic device of claim 15, wherein to continuously detect comprises the processor configured to:
    determine a first sum of capacitive readings for a first input frame from the sequence;
    determine a second sum of capacitive readings for a second input frame from the sequence, the second input frame being sequential to the first input frame; and
    in response to a difference between the first sum and the second sum being above a pre-determined threshold, detect the user interaction with the at least one edge of the electronic device.

20. A non-transitory computer readable medium containing program instructions for causing an electronic device to perform a method of:
    acquiring a sequence of input frames from a capacitive sensor, an input frame comprising information about capacitive readings of the capacitive sensor along at least one edge of a touchscreen; and
    continuously detecting user interaction with the at least one edge of the electronic device using the sequence of input frames.

* * * * *